US011267312B2

(12) United States Patent
Inokuchi et al.

(10) Patent No.: US 11,267,312 B2
(45) Date of Patent: Mar. 8, 2022

(54) AIR CONDITIONING CONTROL DEVICE

(71) Applicants: TOYOTA JIDOSHA KABUSHIKI KAISHA, Aichi-ken (JP); DENSO CORPORATION, Aichi-pref (JP)

(72) Inventors: Takaaki Inokuchi, Nagoya (JP); Asuka Marumo, Kariya (JP)

(73) Assignees: TOYOTA JIDOSHA KABUSHIKI KAISHA, Aichi-ken (JP); DENSO CORPORATION, Aichi-pref (JP)

( * ) Notice: Subject to any disclaimer, the term of this patent is extended or adjusted under 35 U.S.C. 154(b) by 189 days.

(21) Appl. No.: 16/807,163

(22) Filed: Mar. 3, 2020

(65) Prior Publication Data

US 2020/0282801 A1 Sep. 10, 2020

(30) Foreign Application Priority Data

Mar. 7, 2019 (JP) .............................. JP2019-041853

(51) Int. Cl.
*B60H 1/00* (2006.01)
(52) U.S. Cl.
CPC ..... *B60H 1/00735* (2013.01); *B60H 1/00964* (2013.01); *B60H 1/00971* (2013.01)
(58) Field of Classification Search
CPC ............ B60H 1/00735; B60H 1/00964; B60H 1/00657; B60H 1/00778; B60H 1/00742
See application file for complete search history.

(56) References Cited

U.S. PATENT DOCUMENTS

| 6,100,811 A * | 8/2000 | Hsu ..................... | B60H 1/00642 340/426.36 |
| 2009/0150024 A1 * | 6/2009 | Kojima .............. | B60H 1/00771 701/36 |
| 2009/0248244 A1 * | 10/2009 | Sumimoto ......... | B60H 1/00735 701/36 |
| 2013/0204497 A1 * | 8/2013 | DePetro ............. | B60H 1/00742 701/49 |

(Continued)

FOREIGN PATENT DOCUMENTS

| JP | 2007-15504 A | 1/2007 |
| JP | 2009-248626 A | 10/2009 |

*Primary Examiner* — Nelson J Nieves
(74) *Attorney, Agent, or Firm* — Hauptman Ham, LLP

(57) ABSTRACT

An air conditioning control device stores air conditioning control settings relating to plural users of a vehicle, and controls at least one air conditioner among plural air conditioners of the vehicle in accordance with an air conditioning control setting relating to at least one user among the air conditioning control settings relating to the plural users, and senses a pre-air-conditioning command to operate at least one air conditioner among the plural air conditioners of the vehicle, and, after operation of the at least one air conditioner related to the pre-air-conditioning command is started in accordance with the pre-air-conditioning command, in a case in which turning on of an ignition or turning on of a power supply of the vehicle is sensed, instructs execution of continued operation of the at least one air conditioner related to the pre-air-conditioning command in accordance with the pre-air-conditioning command, regardless of the air conditioning control settings relating to the plural users.

9 Claims, 6 Drawing Sheets

(56) References Cited

U.S. PATENT DOCUMENTS

| | | | |
|---|---|---|---|
| 2014/0310739 A1* | 10/2014 | Ricci | B60R 25/25 |
| | | | 725/28 |
| 2017/0139386 A1* | 5/2017 | Pillai | F24F 3/12 |
| 2019/0176730 A1* | 6/2019 | Choi | B60H 1/00878 |
| 2019/0184788 A1* | 6/2019 | Stachewicz | G06K 9/00838 |
| 2020/0156436 A1* | 5/2020 | Urano | B60H 1/00971 |
| 2020/0164717 A1* | 5/2020 | Mullett | B60H 1/0073 |
| 2020/0189352 A1* | 6/2020 | Han | G01J 5/12 |
| 2020/0207326 A1* | 7/2020 | Wenger | B60H 1/00878 |
| 2021/0300404 A1* | 9/2021 | Bruckmeier | B60H 3/0035 |

* cited by examiner

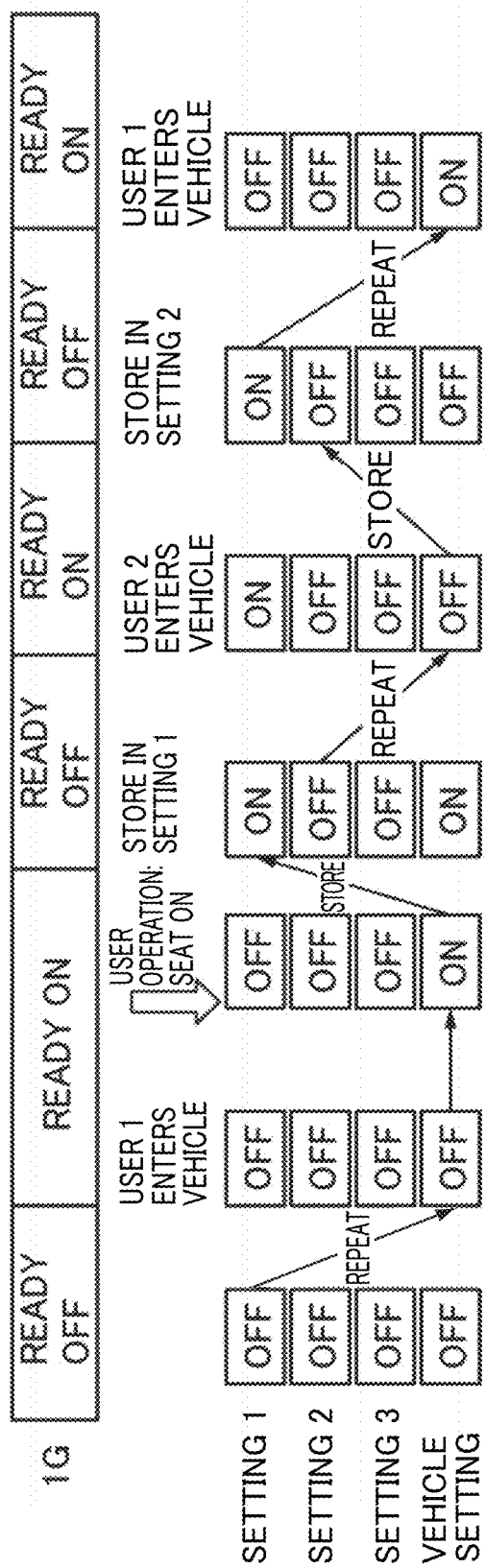

AIR CONDITIONING CONTROL DEVICE

CROSS-REFERENCE TO RELATED APPLICATION

This application is based on and claims priority under 35 USC 119 from Japanese Patent Application No. 2019-041853 filed on Mar. 7, 2019, the disclosure of which is incorporated by reference herein.

BACKGROUND

Technical Field

The present disclosure relates to an air conditioning control device of a vehicle.

Related Art

The in-cabin environment of a vehicle is affected by sunlight and the outside air temperature, and becomes hot in the summer and cold in the winter. There are times when the heat or the cold within the cabin is marked to the extent that it is difficult to drive off immediately after getting into the vehicle. As a countermeasure thereto, vehicles have been developed that are equipped with a pre-air-conditioning function that works the air conditioner of the vehicle in advance before passengers get into the vehicle.

Further, vehicles have been developed in which plural air conditioning zones, at which air conditioning control can be carried out independently of one another, are provided in the vehicle cabin. For example, Japanese Patent Application Laid-Open (JP-A) No. 2007-015504 discloses a vehicle air conditioner that carries out pre-air-conditioning control with respect to only an air conditioning zone that has been set, by remote operation, as a priority zone among the plural air conditioning zones.

However, in the air conditioning control device of JP-A No. 2007-015504, in a case in which a priority zone is not designated by a user at the time when the user instructs pre-air-conditioning control, the selection and setting are set autonomously at the air conditioner side in accordance with the passenger riding situation of the previous time or in accordance with statistics relating to passenger riding situations of the past. Therefore, there is the concern that the demands of the passenger that is the user cannot be appropriately reflected.

SUMMARY

The present disclosure provides an air conditioning control device that enables pre-air-conditioning that reflects the demands of a passenger.

An air conditioning control device relating to an aspect of the present disclosure stores air conditioning control settings relating to plural users of a vehicle, and controls at least one air conditioner among plural air conditioners of the vehicle in accordance with an air conditioning control setting relating to at least one user among the air conditioning control settings relating to the plural users, and senses a pre-air-conditioning command to operate at least one air conditioner among the plural air conditioners of the vehicle, and, after operation of the at least one air conditioner related to the pre-air-conditioning command is started in accordance with the pre-air-conditioning command, in a case in which turning on of an ignition or turning on of a power supply of the vehicle is sensed, instructs execution of continued operation of the at least one air conditioner related to the pre-air-conditioning command in accordance with the pre-air-conditioning command, regardless of the air conditioning control settings relating to the plural users.

In accordance with the air conditioning control device relating to the aspect of the present disclosure, after pre-air-conditioning starts, the user who initially enters into the vehicle is assumed to be the user who instructed the pre-air-conditioning, and the pre-air-conditioning working is continued while prioritizing the setting corresponding to that user.

As described above, in accordance with the present disclosure, after pre-air-conditioning starts, by assuming that the user who initially enters into the vehicle is the user who instructed the pre-air-conditioning, and continued pre-air-conditioning working while prioritizing the setting corresponding to that user, the effect is achieved that pre-air-conditioning that reflects the demands of the passenger is possible.

BRIEF DESCRIPTION OF THE DRAWINGS

An exemplary embodiment of the present invention will be described in detail based on the following figures, wherein:

FIG. 2A is an explanatory drawing showing an example of air conditioning control corresponding to a passenger, among examples of the workings of the air conditioning control device relating to the embodiment of the present disclosure;

DETAILED DESCRIPTION

Figure 1:
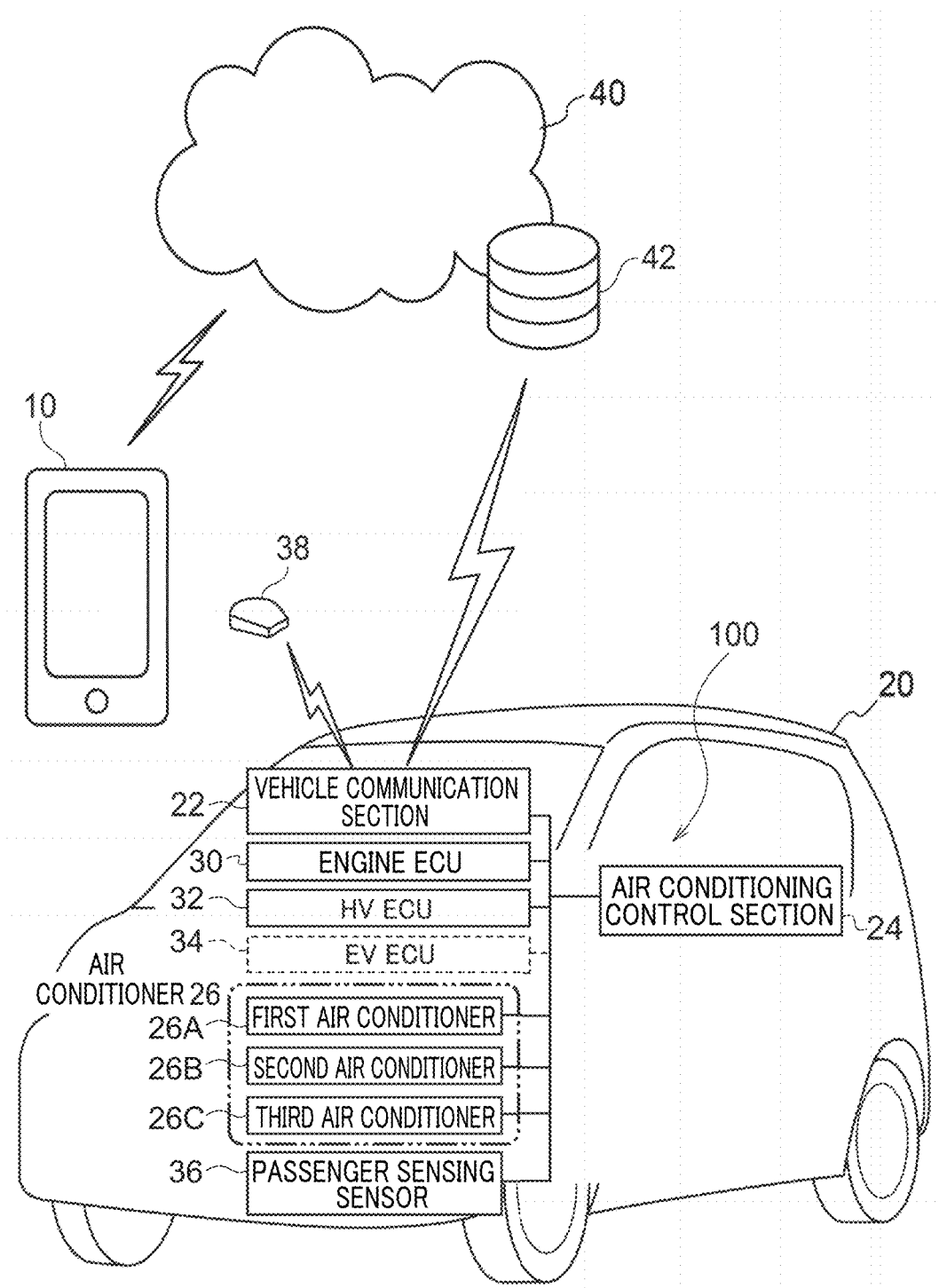
FIG. 1 is an explanatory drawing showing the relationship between an air conditioning control device relating to an embodiment of the present disclosure and other structures.

An example of a form for implementing the present disclosure is described in detail hereinafter with reference to the drawings. FIG. 1 is an explanatory drawing showing the relationship between an air conditioning control device 100 relating to an embodiment of the present disclosure, and other structures. As shown in FIG. 1, the air conditioning control device 100 relating to the present embodiment includes an air conditioning control section 24. A portable information terminal 10 such as a smart phone or the like can communicate wirelessly via a network 40 and a server 42. An onboard communication section 22 of a vehicle 20 can communicate wirelessly via the network 40 and the server 42.

The vehicle 20 has an engine ECU 30, an HVECU 32, and, when needed, an EVECU 34, and passenger sensing sensors 36. The air conditioning control section 24 is connected to the onboard communication section 22 and the like. Further, the vehicle 20 has an air conditioner 26 that includes a first air conditioner 26A, a second air conditioner 26B and a third air conditioner 26C that can carry out air conditioning with respect to respectively different air conditioning areas. As an example, the first air conditioner 26A carries out air conditioning of the space around the front seats including the driver's seat and the front passenger's seat, the second air conditioner 26B carries out air conditioning of the driver's seat, and the third air conditioner 26C carries out air conditioning of the steering wheel.

The first air conditioner 26A, the second air conditioner 26B and the third air conditioner 26C are respectively controlled by the air conditioning control section 24. The air conditioning control section 24 is connected to the onboard communication section 22. At the air conditioning control device 100 relating to the present embodiment, a user can set pre-air-conditioning by using the portable information terminal 10 and by remote operation via the network 40 and the server 42. The air conditioning control section 24 sets pre-air-conditioning in accordance with a pre-air-conditioning setting command that is received at the onboard communication section 22, and controls the first air conditioner 26A, the second air conditioner 26B and the third air conditioner 26C respectively on the basis of this setting. The control of the first air conditioner 26A, the second air conditioner 26B and the third air conditioner 26C respectively by the air conditioning control section 24 is called air conditioning control hereinafter.

Further, the vehicle 20 asks for authentication at the time of start-up of the engine (at the time the power supply is turned on), and identifies the passenger on the basis of the authentication, and judges the propriety of starting-up the engine. Further, the air conditioning section 24 controls the first air conditioner 26A, the second air conditioner 26B and the third air conditioner 26C respectively in accordance with the authenticated passenger. This authentication may be carried out by a smart key 38 and the passenger sensing sensor 36.

Figure 2B:
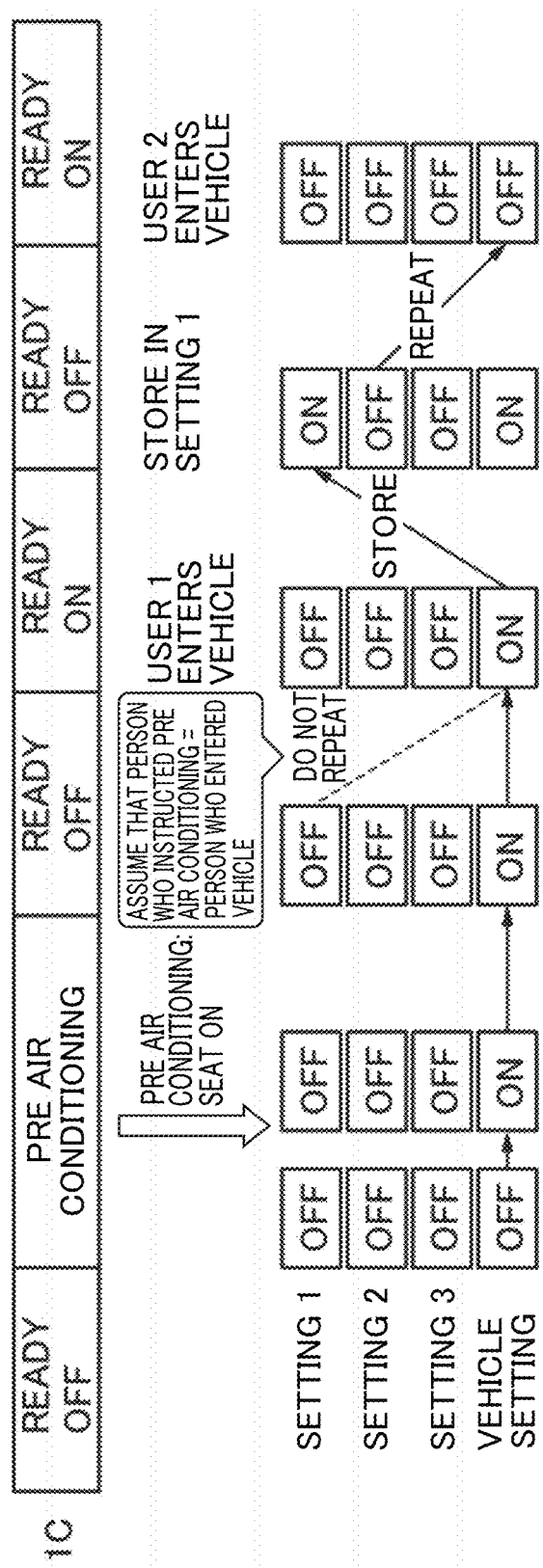
FIG. 2B is an explanatory drawing showing an example of air conditioning control corresponding to a passenger and involving pre-air-conditioning, among examples of the workings of the air conditioning control device relating to the embodiment of the present disclosure.

FIGS. 2A and 2B show examples of the workings of the air conditioning control device 100 relating to the present embodiment. FIG. 2A is an explanatory drawing showing an example of air conditioning control corresponding to a passenger, among examples of the workings of the air conditioning control device relating to the embodiment of the present disclosure. FIG. 2B is an explanatory drawing showing an example of air conditioning control corresponding to a passenger and involving pre-air-conditioning, among examples of the workings of the air conditioning control device relating to the embodiment of the present disclosure.

As shown in FIG. 2A, when the ignition that is indicated as IG (the power supply in a case in which the vehicle 20 is an EV or the like) is turned on, the air conditioning control section 24 of the air conditioning control device 100 relating to the present embodiment executes the air conditioning control that is set at the vehicle 20 per identified user. As an example, setting 1 is for user 1, setting 2 is for user 2, and setting 3 is for user 3. Further, when the air conditioning is operated by a user who has entered into the vehicle, the air conditioning setting that is in accordance with that operation is made to be the vehicle setting, and the first air conditioner 26A, the second air conditioner 26B and the third air conditioner 26C are respectively controlled by prioritizing that vehicle setting over settings 1 through 3.

In FIG. 2A, because initial setting 1 is that the air conditioning is off, when user 1 gets into the vehicle, the air conditioning is off. However, after user 1 sits down and turns the air conditioning (any of the first air conditioner 26A, the second air conditioner 26B and the third air conditioner 26C) on, when the ignition is turned off, the vehicle settings relating to the operation of user 1 are stored as setting 1. Thereafter, when user 2 gets into the vehicle, the air conditioning is off in accordance with setting 2. Thereafter, when user 1 gets into the vehicle again, the air conditioning is turned on in accordance with setting 1 to which the setting has been changed on the basis of the most recent air conditioning operation of user 1.

If a pre-air-conditioning setting is involved, control of the air conditioning is as shown in FIG. 2B as an example. In the state in which the ignition of the vehicle 20 is off, when a pre-air-conditioning command that turns the air conditioning on is received from the portable information terminal 10, the air conditioning control section 24 starts air conditioning control that causes the air conditioning to work in accordance with that command.

Thereafter, in a case in which user 1 gets into the vehicle, setting 1 for user 1 is air conditioning off. However, because user 1 is the user who gets into the vehicle first after the start of the pre-air-conditioning, user 1 who has gotten into the vehicle is assumed to be the user who instructed the pre-air-conditioning, and air conditioning control in accordance with the pre-air-conditioning is continued.

Thereafter, when the ignition of the vehicle 20 is turned off, the vehicle setting that is in accordance with the pre-air-conditioning is stored as setting 1. Thereafter, when user 2 gets into the vehicle, the air conditioning is off in accordance with setting 2.

Figure 3:
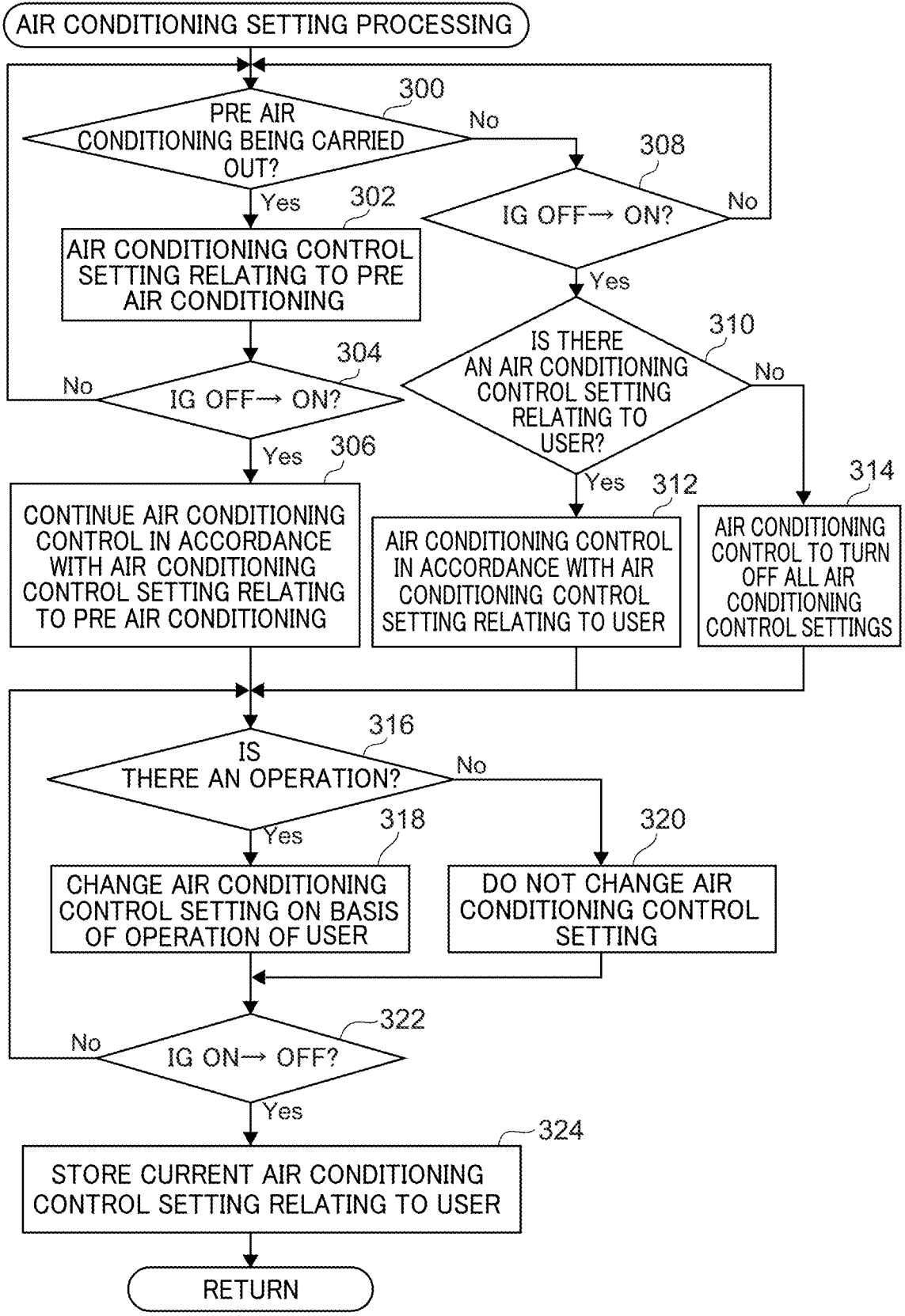
FIG. 3 is a flowchart showing an example of air conditioning setting processing of the air conditioning control device relating to the embodiment of the present disclosure.

FIG. 3 is a flowchart showing an example of air conditioning setting processing of the air conditioning control device 100 relating to the present embodiment. In step 300, it is judged whether or not pre-air-conditioning is being carried out. The judgment as to the absence/presence of pre-air-conditioning working is, as an example, based on the absence/presence of a command to execute pre-air-conditioning from the portable information terminal 10. In a case in which pre-air-conditioning is being carried out, the routine moves on to step 302, and, in a case in which pre-air-conditioning is not being carried out, the routine moves on to step 308.

In step 302, air conditioning control that relates to the pre-air-conditioning is made to be the setting. Next, in step 304, it is judged whether the ignition of the vehicle 20 has been switched from off to on. In step 304, if the ignition has been switched from off to on, the routine moves on to step 306, whereas, if the ignition remains off, the routine moves on to step 300.

In step 306, air conditioning control is continued in accordance with the air conditioning control setting related to the pre-air-conditioning. In step 308, it is judged whether or not the ignition of the vehicle has been switched from off to on. In step 308, if the ignition has been switched from off to on, the routine moves on to step 310, whereas, if the ignition remains off, the routine moves on to step 300.

In step 310, the absence/presence of an air conditioning control setting relating to the user is judged. If there is an air conditioning control setting relating to the user, the routine moves on to step 312, whereas, if there is no air conditioning control setting relating to the user, the routine moves on to step 314.

In step 312, air conditioning control is executed in accordance with the air conditioning control setting relating to the user. In step 314, air conditioning control is executed in accordance with an air conditioning control setting that turns all of the air conditioners off.

In step 316, the absence/presence of operation of the air conditioning by the user is judged. In step 316, if the air conditioning has been operated by the user, the routine moves on to step 318, whereas, if there is no air conditioning operation by the user, the routine moves on to step 320.

In step 318, air conditioning control setting is carried out on the basis of the operation of the user, and air conditioning control is carried out in accordance with that air conditioning control setting. In step 320, the air conditioning control of any one of steps 306, 312, 314 is continued, and the air conditioning control setting is not changed.

In step 322, it is judged whether or not the ignition of the vehicle 20 has been switched from on to off. In step 312, if the ignition has been switched from on to off, the routine moves on to step 324, whereas, if the ignition remains on, the routine moves on to step 316.

In step 324, the air conditioning control is ended, and the stored air conditioning control setting relating to the user who carried out the operation is changed to the most recent state, and the routine returns.

Figure 4:
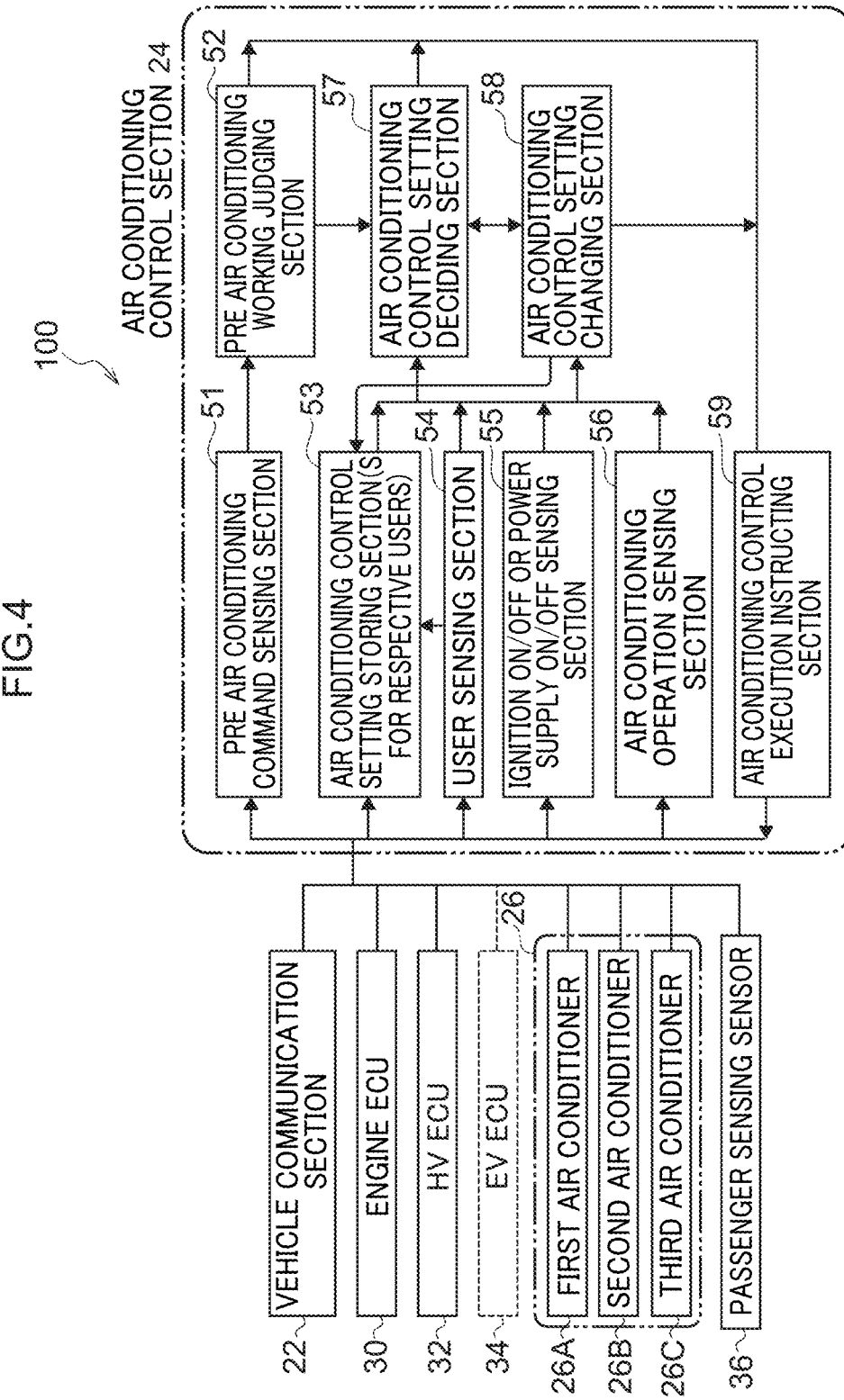
FIG. 4 is a block drawing showing the schematic structure of the air conditioning control device relating to the embodiment of the present disclosure.

FIG. 4 is a block drawing showing the schematic structure of the air conditioning control device 100 relating to the embodiment of the present disclosure. A pre-air-conditioning command sensing section 51 senses a pre-air-conditioning command that is transmitted from the onboard communication section 22. A pre-air-conditioning working judging section 52 judges operation of at least one air conditioner related to the air conditioning command, in accordance with the pre-air-conditioning command transmitted from the pre-air-conditioning command sensing section 51.

Air conditioning control setting storing sections 53 for the respective users store the air conditioning control settings relating to the plural users of the vehicle. The storing of the air conditioning control settings relating to the plural users of the vehicle is carried out on the basis of the current or past operation of the air conditioner 26 by the corresponding user, or the pre-air-conditioning setting by remote operation using the portable information terminal 10, or the like.

A user sensing section 54 senses the individual users by, for example, the passenger sensing sensors 36 or the smart keys 38 or the like. An ignition on/off or power supply on/off sensing section 55 acquires, via bus communication of the vehicle 20 or the like, information from the engine ECU 30, the HVECU 32, and, when needed, the EVECU 34 and the like, and senses the on/off state of the ignition or the on/off state of the power supply of the vehicle 20. By bus communication of the vehicle 20 or the like, an air conditioning operation sensing section 56 senses, in association with a user, operations by which that user operates the air conditioner 26, from the air conditioner 26, the passenger sensing sensor 36, the smart key 38 and the like.

An air conditioning control setting deciding section 57 decides upon the air conditioning control setting, on the basis of the air conditioning control setting that relates to the user and is stored in the air conditioning control setting storing section 53, and while taking into consideration information from the user sensing section 54 and the ignition on/off or power supply on/off sensing section 55. On the basis of the operation by which the user operated the air conditioner 26 which operation was sensed by the air conditioning operation sensing section 56, an air conditioning control setting changing section 58 changes the air conditioning control setting that was decided upon by the air conditioning control setting deciding section 57. Further, after air conditioning control ends, the air conditioning control setting changing section 58 changes the stored air conditioning control setting, which relates to the user who carried out the operation, to the most recent state, and transmits, to the air conditioning control setting storing section 53 of that user, the changed air conditioning control setting relating to that user.

An air conditioning control execution instructing section 59 causes the air conditioner 26 to work in accordance with the air conditioning control setting that was decided upon by the air conditioning control setting deciding section 57, or in accordance with the judgment on the operation of the air conditioner 26 which judgment was carried out by the pre-air-conditioning working judging section 52. Here, after operation of the air conditioner 26 related to the pre-air-conditioning command is started in accordance with the pre-air-conditioning command, in a case in which turning on of the ignition or turning on of the power supply of the vehicle 20 is sensed by the ignition on/off or power supply on/off sensing section 55, the air conditioning control execution instructing section 59 instructs execution of the continued operation of the air conditioner 26 that relates to the pre-air-conditioning command in accordance with the judgment on the operation of the air conditioner 26 that was carried out by the pre-air-conditioning working judging section 52, regardless of the air conditioning control setting that was decided on by the air conditioning control setting deciding section 57.

The air conditioning control device 100 is configured such that, after the air conditioning control execution instructing section 59 instructs execution of the continuance of operation of the air conditioner 26 that relates to the pre-air-conditioning command in accordance with the pre-air-conditioning command, in a case in which the air conditioning operation sensing section 56 senses an operation, the air conditioning control setting changing section 58 changes the air conditioning control setting, which was decided upon by the air conditioning control setting deciding section 57, to the air conditioning control setting that controls the air conditioner 26 that relates to the operation in accordance with the operation, and the air conditioning control execution instructing section 59 instructs execution of control of the air conditioner 26 that relates to the operation in accordance with the changed air conditioning control setting that has been changed by the air conditioning control setting changing section 58.

Further, the air conditioning control device 100 is configured such that, after the air conditioning control execution instructing section 59 instructs execution of control of the air conditioner 26 that relates to the operation in accordance with the changed air conditioning control setting, in a case in which the ignition on/off or power supply on/off sensing section 55 senses turning off of the ignition or turning off of the power supply of the vehicle 20, the air conditioning control execution instructing section 59 ends the air conditioning control, and the air conditioning control setting changing section 58 changes the stored air conditioning control setting that relates to the user who carried out the operation to the most recent state, and transmits the changed air conditioning control setting relating to the user to the air conditioning control setting storing section 53 for that user, and the air conditioning control setting storing section 53 for that user stores the changed air conditioning control setting relating to that user.

Note that, although FIG. 4 illustrates an embodiment in which the vehicle 20 includes the air conditioning control section 24, there may be an embodiment in which the portable information terminal 10 includes the air conditioning control section 24.

Figure 5:
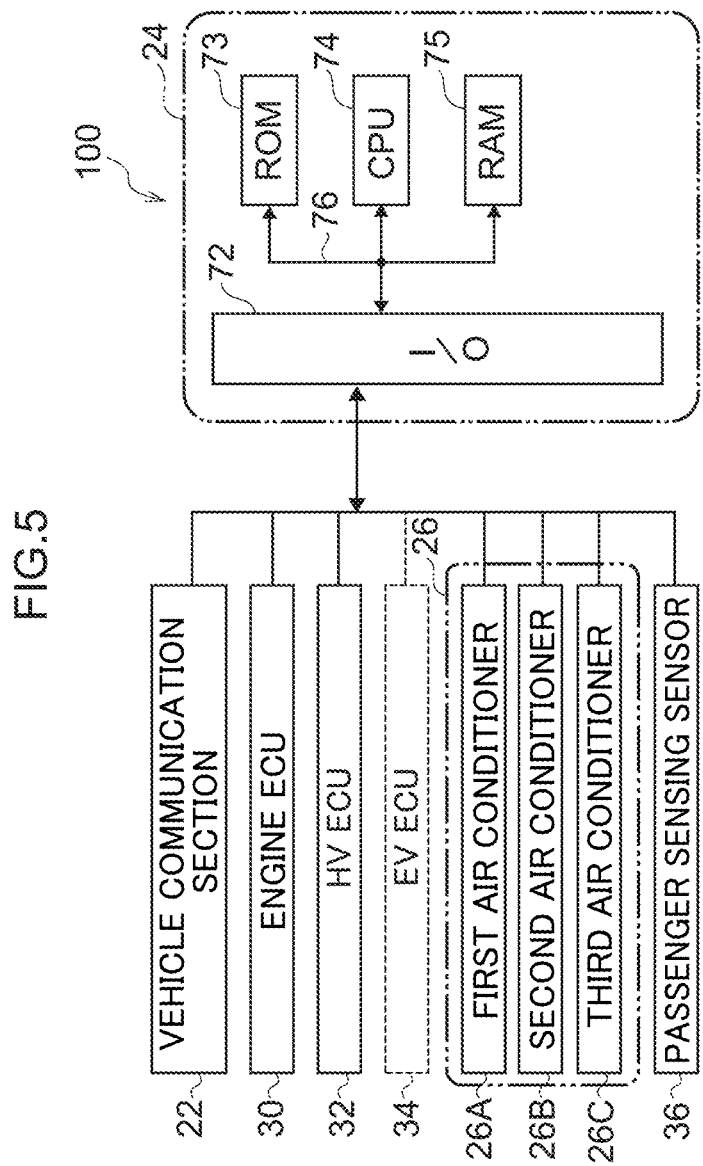
FIG. 5 is a block drawing showing the concrete structure of the air conditioning control device relating to a modified example of an embodiment of the present disclosure.

The air conditioning control device 100 relating to the embodiment of the present disclosure is described more concretely hereinafter. FIG. 5 is a block drawing showing the concrete structure of the air conditioning control device 100 relating to a modified example of the embodiment of the present disclosure. Note that structures that are similar to those of FIG. 1 and FIG. 4 are denoted by the same reference numerals.

The air conditioning control section 24 can be configured concretely by a computer in which a CPU 74, a ROM 73, a RAM 75 and an I/O (input/output interface) 72 are connected to a bus 76.

A program for instructing execution of pre-air-conditioning control of the air conditioner 26, and the like, are stored in the ROM 73. Due to the program that is stored in the ROM 73, which serves as a memory, being expanded in the RAM 75 and being executed by the CPU 74 that serves as a processor, the air conditioner 26 is made to execute pre-air-conditioning control.

The vehicle communication section 22, the engine ECU 30, the HVECU 32, and, when needed, the EVECU 34, the air conditioner 26, and the air conditioning control section 24 that controls the air conditioner 26, are connected to the I/O 72.

Although FIG. 5 illustrates an embodiment in which the air conditioning control section 24 is included in the vehicle 20, the air conditioning control section 24 may be included in the portable information terminal 10.

Further, the processings that are executed at the air conditioning control device 100 in the embodiment have been described as software processings that are carried out by programs being executed. However, the present disclosure is not limited to this, and these processings may be processings that are carried out by hardware for example, or may be processings that are carried out by a combination of software and hardware. In the case of processing by software, the program may be stored and distributed on any of various types of non-transitory storage media, such as a DVD (Digital Versatile Disc) or the like, and cause a processor such as the CPU 74 or the like to execute processing.

As described above, in accordance with the air conditioning control device 100 relating to the present embodiment, after pre-air-conditioning starts, the user who first gets into the vehicle is assumed to be the user who instructed the pre-air-conditioning, and the operation of the pre-air-conditioning is continued while prioritizing the setting corresponding to that user. Therefore, pre-air-conditioning that reflects the demands of the passenger is possible. Further, even if pre-air-conditioning is being carried out, air conditioning control in accordance with the operation of the user who has entered into the vehicle is prioritized, and therefore, air conditioning control that reflects the demands of the passenger is possible.

The present disclosure is not limited to the above-described embodiments and, in addition to the above-described embodiments, can of course be implemented by being modified in various forms within a scope that does not depart from the gist thereof.

What is claimed is:

1. An air conditioning control device, comprising:
    a memory; and
    a processor,
    wherein the processor is configured to store air conditioning control settings relating to a plurality of users of a vehicle, to control at least one air conditioner among a plurality of air conditioners of the vehicle in accordance with an air conditioning control setting relating to at least one user among the air conditioning control settings relating to the plurality of users, to sense a pre-air-conditioning command to operate at least one air conditioner among the plurality of air conditioners of the vehicle, and, after operation of the at least one air conditioner related to the pre-air-conditioning command is started in accordance with the pre-air-conditioning command, in a case in which turning on of an ignition or turning on of a power supply of the vehicle is sensed, to instruct execution of continued operation of the at least one air conditioner related to the pre-air-conditioning command in accordance with the pre-air-conditioning command, regardless of the air conditioning control settings relating to the plurality of users.

2. The air conditioning control device of claim 1, wherein the processor is configured, after continuing the operation of the at least one air conditioner related to the pre-air-conditioning command in accordance with the pre-air-conditioning command, in a case in which an operation by which at least one user operates at least one air conditioner among the plurality of air conditioners is sensed, to instruct execution of control of the at least one air conditioner related to the operation in accordance with the operation by the at least one user.

3. The air conditioning control device of claim 2, wherein the processor is configured, after controlling the at least one air conditioner related to the operation by the at least one user, in a case in which turning off of the ignition or turning off of the power supply of the vehicle is sensed, to end air conditioning control and change an air conditioning control setting, which is stored and which relates to the at least one user who carried out the operation, to a most recent state.

4. An air conditioning control method, comprising:
    by a processor, storing air conditioning control settings relating to a plurality of users of a vehicle, controlling at least one air conditioner among a plurality of air conditioners of the vehicle in accordance with an air conditioning control setting relating to at least one user among the air conditioning control settings relating to the plurality of users, sensing a pre-air-conditioning command to operate at least one air conditioner among the plurality of air conditioners of the vehicle, and, after operation of the at least one air conditioner related to the pre-air-conditioning command is started in accordance with the pre-air-conditioning command, in a case in which turning on of an ignition or turning on of a power supply of the vehicle is sensed, instructing execution of continued operation of the at least one air conditioner related to the pre-air-conditioning command in accordance with the pre-air-conditioning command, regardless of the air conditioning control settings relating to the plurality of users.

5. The air conditioning control method of claim 4, further comprising, by the processor, after continuing the operation of the at least one air conditioner related to the pre-air-conditioning command in accordance with the pre-air-conditioning command, in a case in which an operation by which at least one user operates at least one air conditioner among the plurality of air conditioners is sensed, instructing execution of control of the at least one air conditioner related to the operation in accordance with the operation by the at least one user.

6. The air conditioning control method of claim 5, further comprising, by a processor, after controlling the at least one air conditioner related to the operation by the at least one user, in a case in which turning off of the ignition or turning off of the power supply of the vehicle is sensed, ending air conditioning control, and changing an air conditioning control setting, which is stored and which relates to the at least one user who carried out the operation, to a most recent state.

7. A non-transitory storage medium that stores a program for causing a processor to execute air conditioning control processing, comprising:

storing air conditioning control settings relating to a plurality of users of a vehicle, controlling at least one air conditioner among a plurality of air conditioners of the vehicle in accordance with an air conditioning control setting relating to at least one user among the air conditioning control settings relating to the plurality of users, sensing a pre-air-conditioning command to operate at least one air conditioner among the plurality of air conditioners of the vehicle, and, after operation of the at least one air conditioner related to the pre-air-conditioning command is started in accordance with the pre-air-conditioning command, in a case in which turning on of an ignition or turning on of a power supply of the vehicle is sensed, instructing execution of continued operation of the at least one air conditioner related to the pre-air-conditioning command in accordance with the pre-air-conditioning command, regardless of the air conditioning control settings relating to the plurality of users.

8. The non-transitory storage medium of claim 7, wherein the processing further comprises, after continuing the operation of the at least one air conditioner related to the pre-air-conditioning command in accordance with the pre-air-conditioning command, in a case in which an operation by which at least one user operates at least one air conditioner among the plurality of air conditioners is sensed, instructing execution of control of the at least one air conditioner related to the operation in accordance with the operation by the at least one user.

9. The non-transitory storage medium of claim 8, wherein the processing further comprises, after controlling the at least one air conditioner related to the operation by the at least one user, in a case in which turning off of the ignition or turning off of the power supply of the vehicle is sensed, ending air conditioning control, and changing an air conditioning control setting, which is stored and which relates to the at least one user who carried out the operation, to a most recent state.

* * * * *